(12) United States Patent
Azibert et al.

(10) Patent No.: US 11,608,898 B2
(45) Date of Patent: Mar. 21, 2023

(54) EXTERNALLY ENERGIZED SECONDARY SEALS IN SPLIT MECHANICAL SEALS

(71) Applicant: A.W. CHESTERTON COMPANY, Groveland, MA (US)

(72) Inventors: Henri Vincent Azibert, Windham, NH (US); Robert James Powers, Salem, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 105 days.

(21) Appl. No.: 17/339,397

(22) Filed: Jun. 4, 2021

(65) Prior Publication Data
US 2021/0381603 A1    Dec. 9, 2021

Related U.S. Application Data

(60) Provisional application No. 63/035,504, filed on Jun. 5, 2020.

(51) Int. Cl.
*F16J 15/34* (2006.01)

(52) U.S. Cl.
CPC ................................ *F16J 15/3488* (2013.01)

(58) Field of Classification Search
CPC .................................................. F16J 15/3488
See application file for complete search history.

(56) References Cited

U.S. PATENT DOCUMENTS

| | | |
|---|---|---|
| 1,544,609 A | 7/1925 | Somes |
| 2,258,190 A | 10/1941 | Neilon |
| 2,834,616 A | 5/1958 | Gebert et al. |
| 3,071,385 A | 1/1963 | Greiner |
| 3,124,502 A | 3/1964 | Radke |
| 3,524,654 A | 8/1970 | Hasselbacher |

(Continued)

FOREIGN PATENT DOCUMENTS

| | | |
|---|---|---|
| CN | 101490450 A | 7/2009 |
| CN | 102506177 A | 6/2012 |

(Continued)

OTHER PUBLICATIONS

International Search Report and Written Opinion for Application No. PCT/US2021/035906, dated Oct. 7, 2021, 14 pages.

*Primary Examiner* — Vishal A Patel
(74) *Attorney, Agent, or Firm* — Nelson Mullins Riley & Scarborough LLP; Anthony A. Laurentano

(57) ABSTRACT

A mechanical seal that employs an axially movable spring holder plate that engages a sealing element, such as an O-ring, associated with a stationary seal ring. In turn, the stationary seal ring can have a sealing face that engages with a sealing face of a rotary seal ring. The rotary seal ring can also have a sealing element, such as an O-ring, associated therewith. The O-rings are initially disposed in an unloaded position where they are not radially compressed and hence the ends do not expand circumferentially past the end faces of the holder or gland segments. The spring holder plate can be moved axially by tightening selected bolts associated therewith. When moved axially, the spring holder plate moves the stationary seal ring and the O-ring associated therewith in an axially inboard direction, thus placing the O-rings in a loaded position, where the O-rings are radially compressed.

13 Claims, 12 Drawing Sheets

(56) References Cited

U.S. PATENT DOCUMENTS

| | | |
|---|---|---|
| 4,364,571 A | 12/1982 | Hershey |
| 4,410,188 A | 10/1983 | Copes |
| 4,575,098 A | 3/1986 | Escue |
| 4,576,384 A | 3/1986 | Azibert |
| 4,580,793 A | 4/1986 | Bronson |
| 4,666,001 A | 5/1987 | Burr |
| 4,669,739 A | 6/1987 | Riccitelli |
| 4,682,913 A | 7/1987 | Shatto et al. |
| 4,836,694 A | 6/1989 | Schmehr et al. |
| 4,928,371 A | 5/1990 | Colanzi et al. |
| 5,039,113 A | 8/1991 | Gardner |
| 5,114,163 A | 5/1992 | Radosav et al. |
| 5,192,083 A | 3/1993 | Jones, Jr. et al. |
| 5,199,720 A | 4/1993 | Radosav et al. |
| 5,370,401 A | 12/1994 | Sandgren |
| 5,490,021 A | 2/1996 | Muller et al. |
| 5,571,268 A * | 11/1996 | Azibert ............... F16J 15/3488 277/390 |
| 5,711,532 A | 1/1998 | Clark et al. |
| 5,716,054 A | 2/1998 | Duffee et al. |
| 5,730,447 A | 3/1998 | Dawson et al. |
| 5,820,129 A | 10/1998 | Reagan |
| 5,961,122 A | 10/1999 | Marsi |
| 6,007,069 A | 12/1999 | Sadowski |
| 6,059,293 A | 5/2000 | Azebert et al. |
| 6,076,832 A | 6/2000 | Pow |
| 6,350,060 B1 | 2/2002 | Peterson |
| 6,457,720 B1 | 10/2002 | London |
| 6,485,023 B2 | 11/2002 | Budrow et al. |
| 6,485,024 B1 | 11/2002 | Pippert et al. |
| 6,814,355 B2 | 11/2004 | Bjomson |
| 6,918,593 B2 | 7/2005 | Takahashi |
| 7,708,283 B2 | 5/2010 | Azibert et al. |
| 7,887,061 B2 | 2/2011 | Van Dyke et al. |
| 8,091,897 B2 | 1/2012 | Giard |
| 9,546,734 B2 | 1/2017 | Cid et al. |
| 10,352,457 B2 | 7/2019 | Cid |
| 2002/0101038 A1 | 8/2002 | Budrow et al. |
| 2004/0150166 A1 | 8/2004 | Takahashi |
| 2005/0087931 A1 | 4/2005 | Yamauchi et al. |
| 2007/0267818 A1 | 11/2007 | Giard |
| 2008/0246178 A1 | 10/2008 | Hashimoto |
| 2009/0019743 A1 | 1/2009 | Nguyen |
| 2011/0221136 A1 | 9/2011 | Dudek |
| 2014/0159316 A1* | 6/2014 | Cid ..................... F16J 15/3464 267/164 |

FOREIGN PATENT DOCUMENTS

| | | |
|---|---|---|
| CN | 109058466 A | 12/2018 |
| CN | 110081176 A | 8/2019 |
| EP | 0438346 A1 | 7/1991 |
| EP | 0658713 A1 | 6/1995 |
| GB | 2143911 B | 7/1986 |
| JP | S60-040870 A | 3/1985 |
| WO | 97/04256 A1 | 2/1997 |
| WO | 2007/136453 A2 | 11/2007 |
| WO | 2012/001829 A1 | 1/2012 |

\* cited by examiner

EXTERNALLY ENERGIZED SECONDARY SEALS IN SPLIT MECHANICAL SEALS

RELATED APPLICATION

The present application claims priority to U.S. provisional patent application Ser. No. 63/035,504, filed on Jun. 5, 2020, and entitled EXTERNALLY ENERGIZED SECONDARY SEALS IN SPLIT MECHANICAL SEALS, the contents of which are herein incorporated by reference.

BACKGROUND OF THE INVENTION

Conventional mechanical seals are employed in a wide variety of environments and settings, such as for example, in mechanical apparatuses, to provide a fluid-tight seal. The mechanical seals are usually positioned about a rotating shaft or rod that is mounted in and protrudes from a stationary mechanical housing.

Split mechanical seals are employed in a wide variety of mechanical apparatuses to provide a pressure-tight and fluid-tight seal. The mechanical seal is usually positioned about a rotating shaft that is mounted in and protrudes from stationary equipment. The mechanical seal is usually bolted to the stationary equipment at the shaft exit, thus preventing the loss of pressurized process fluid from the stationary equipment. Conventional split mechanical seals include face-type mechanical seals, which include a pair of seal rings that are concentrically disposed about the shaft and are axially spaced from each other. The seal rings each have sealing faces that are biased into sealing contact with each other. Usually, one seal ring remains stationary while the other seal ring is coupled to the shaft and rotates therewith. The mechanical seal prevents leakage of the pressurized process fluid to the external environment by biasing the seal ring sealing faces into sealing contact with each other. The rotary seal ring is usually mounted in a holder assembly which is disposed in a chamber formed by a gland assembly. The holder assembly can have a pair of holder halves or segments secured together by a screw. Likewise, the gland assembly can have a pair of gland halves or segments that are also secured together by a screw. The seal rings are also often divided into segments, each segment having a pair of sealing faces, thereby resulting in each ring being a split ring that can be mounted about the shaft without the necessity of freeing one end of the shaft.

Prior art split mechanical seals have rotary and stationary components assembled around the shaft and then bolted on to the equipment to be sealed. A rotary seal face is inserted into a rotary metal clamp after the segments are assembled around the shaft. Then, the stationary face segments and gland segments are assembled and the split gland assembly is then bolted to the pump housing. Alternatively, the stationary and rotary sealing components can be preassembled into subassemblies that can then be mounted about the shaft.

Split mechanical seals that come in rotary and stationary halve assemblies (e.g., four sub-assemblies) have the split surfaces of the metal parts, the elastomer gaskets and O-rings, and the primary faces all in line. This significantly increases the difficulty in assuring that all the components are constrained to come back into sealing alignment. For example, as the O-rings are compressed radially inside their grooves, they expand circumferentially with ends protruding, potentially buckling when joined, thereby causing pinching by metal or seal face parts at the location of the split. The conventional method of staggering the splits of the various parts within the rotating or stationary assemblies cannot be utilized as whole sub-assemblies are secured around the shaft and not individual components. This facilitates and speeds up the seal assembly onto the equipment but can result in parts misalignment and subsequent measurable leakage from the joints formed by the sealing components.

SUMMARY OF THE INVENTION

The present invention eliminates this problem specifically as it relates to O-rings or other elastomer split components. The present invention is directed to a split mechanical seal that employs an axially movable spring holder plate. The spring holder plate can engage a sealing element, such as an O-ring, associated with a stationary seal ring. In turn, the stationary seal ring can have a sealing face that engages with a sealing face of a rotary seal ring. The rotary seal ring can also have a sealing element, such as an O-ring, associated therewith. The O-rings are initially disposed in an unloaded position, since the O-rings are not being overly compressed in a radial direction such that the O-rings do not expand circumferentially with ends protruding past the end faces of the holder or gland segments. The spring holder plate can be moved axially by tightening selected bolts associated therewith. When moved axially, the spring holder plate contacts and moves the stationary seal ring and the O-ring associated therewith in an axially inboard direction. The stationary seal ring in turn contacts and moves axially inwardly the rotary seal ring, which in turn moves the O-ring associated therewith in the axially inboard direction. The O-rings are thus moved from the unloaded position to a loaded position where the O-rings are compressed in a radial direction.

The present invention is directed to a mechanical seal for mounting to a housing having a shaft comprising a gland assembly configured for mounting to the housing and having a top surface and an inner surface forming a gland mounting region, wherein the top surface of the gland assembly has a plurality of gland fastener holes formed therein; a holder assembly forming a holder chamber and disposed within the gland mounting region; a rotary seal ring disposed within the holder chamber of the holder assembly and having an outer surface; a rotor sealing element disposed about the outer surface of the rotary seal ring; a stationary seal ring disposed within the gland mounting region and having an outer surface; a stator sealing element disposed about the outer surface of the stationary seal ring; an axially movable spring holder plate having a top surface and an opposed bottom surface and a radially inwardly spaced flange portion, wherein the top surface has a plurality of fastener apertures formed therein; a plurality of biasing clip assemblies configured for mounting about the spring holder plate and for mating engagement with the stationary seal ring for coupling the spring holder plate to the stationary seal ring; and a plurality of fasteners for mounting in the fastener apertures and the gland fastener holes and for securing the spring holder plate to the top surface of the gland assembly. Further, the stator sealing element and the rotor sealing element are disposable in a radially uncompressed state in a first unloaded position and wherein the spring holder plate is movable in the axial direction when the plurality of fasteners are tightened so as to move the stator sealing element and the rotor sealing element in the axial direction into a radially compressed state in a second loaded position.

The top surface of the gland assembly has a plurality of spring holes formed therein and a plurality of springs are mounted in the plurality of spring holes. The holder assembly has an inner surface having a holder detent groove formed therein and the rotary seal ring has a rotary detent groove formed in the outer surface thereof. Further, the inner surface of the stationary seal ring has a groove formed therein for coupling to a portion of each of the plurality of biasing clip assemblies and the inner surface of the gland assembly has a lead-in angled surface. When the plurality of fasteners are tightened, the plurality of biasing clip assemblies applies an axially inward force to the stationary seal ring which in turn applies an axial inward force to the rotary seal ring and the plurality of fasteners axially moves the spring holder plate between the first unloaded position and the second loaded position. In the first unloaded position, the stator sealing element is disposed between the lead-in angled surface and the outer surface of the stationary seal ring and the rotor sealing element is disposed in the holder detent groove and the rotary detent groove such that the stator sealing element and the rotor sealing element are disposed in the radially uncompressed state. In the second loaded position, the stator sealing element is moved axially inwardly from the lead-in angled surface by the flange portion of the spring holder plate and is disposed between the inner surface of the gland and the outer surface of the stationary seal ring and the rotor sealing element is displaced from the holder detent groove by the axial inward movement of the rotary seal ring such that the stator sealing element and the rotor sealing element are disposed in the radially compressed state.

According to the present invention, the spring holder plate has a plurality of recesses formed in the top surface and a portion of each of the plurality of biasing clip assemblies seats in a portion of the recesses. Further, the stationary seal ring has a plurality of spaced apart recesses formed in a top surface thereof. Each of the plurality of biasing clip assemblies comprises an inner spring clip having a main body having an inner ridge portion formed at a first end thereof and configured for engaging with a recessed portion formed in the bottom surface of the spring holder plate, and a bent portion formed at a second opposed end and configured for engaging with one of the plurality of recesses formed in the top surface of the stationary seal ring. The biasing clip assemblies also include an outer spring clip having a first end that is sized and configured for mounting on the main body of the inner spring clip and an opposed second end having a bent tab portion sized and configured for engaging with the groove formed in the inner surface of the stationary seal ring.

The spring holder plate has a main body composed of first and second spring holder plate segments and each of the spring holder plate segments has first and second end faces each of which has a surface feature formed thereon. The surface feature of the first end face of the first spring holder plate segment is a protrusion and the surface feature of the second end face of the first spring holder plate segment is an aperture, and the surface feature of the first end face of the second spring holder plate segment is an aperture configured for seating the protrusion on the first end face of the first spring plate holder segment, and the surface feature of the second end face of the second spring holder plate segment is a protrusion configured for seating in the aperture formed in the second face of the first spring holder plate segment. As such, the surface features on aligned and opposed seal faces of the segments when assembled together are complementary to each other. The main body further has a plurality of recesses formed in the top surface thereof.

The present invention is also directed to a method for positioning a plurality of sealing elements in a mechanical seal. The mechanical seal includes a gland assembly configured for mounting to the housing and having a top surface and an inner surface forming a gland mounting region, wherein the top surface of the gland assembly has a plurality of gland fastener holes formed therein; a holder assembly having an inner surface forming a holder chamber and disposed within the gland mounting region; a rotary seal ring disposed within the holder chamber of the holder assembly and having an inner surface and an opposed outer surface; a rotor sealing element disposed about the outer surface of the rotary seal ring; a stationary seal ring disposed within the gland mounting region and having an inner surface and an opposed outer surface; a stator sealing element disposed about the outer surface of the stationary seal ring; an axially movable spring holder plate having a top surface and an opposed bottom surface and a radially inwardly spaced flange portion, wherein the top surface has a plurality of fastener apertures formed therein; a plurality of biasing clip assemblies configured for mounting about the spring holder plate and for mating engagement with the stationary seal ring for coupling the spring holder plate to the stationary seal ring; and a plurality of fasteners for mounting in the fastener apertures and the gland fastener holes and for securing the spring holder plate to the top surface of the gland assembly. The method of the present invention includes, when the plurality of fasteners are tightened, configuring the plurality of biasing clip assemblies to apply an axially inward force to the stationary seal ring which in turn applies an axial inward force to the rotary seal ring, and configuring the spring holder plate to move axially. Specifically, the spring holder plate is moved axially between an unloaded position where the stator sealing element is disposed between a lead-in angled surface formed in the inner surface of the gland assembly and the outer surface of the stationary seal ring and the rotor sealing element is disposed in a holder detent groove formed in the inner surface of the holder assembly and in a rotary detent groove formed in the outer surface of the rotary seal ring, wherein the stator sealing element and the rotor sealing element are in a radially uncompressed state when in the unloaded position, and a loaded position where the stator sealing element is configured to move axially inwardly from the lead-in angled surface by the flange portion of the spring holder plate and is disposed between the inner surface of the gland and the outer surface of the stationary seal ring and the rotor sealing element is configured to be displaced from the holder detent groove by the axial inward movement of the rotary seal ring, wherein the stator sealing element and the rotor sealing element are in a radially compressed state when in the loaded position.

The plurality of biasing clip assemblies comprises an inner spring clip having a main body having an inner ridge portion formed at a first end thereof and configured for engaging with a recessed portion formed in the bottom surface of the spring holder plate, and a bent portion formed at a second opposed end and configured for engaging with one of the plurality of recesses formed in the top surface of the stationary seal ring; and an outer spring clip having a first end that is sized and configured for mounting on the main body of the inner spring clip and an opposed second end having a bent tab portion sized and configured for engaging with the groove formed in the inner surface of the stationary seal ring. The step of configuring the plurality of biasing clip assemblies to apply an axially inward force, when the plurality of fasteners are tightened, includes applying an axial inward force to the stationary seal ring with the inner spring clip by contacting the recess formed in the top surface of the stationary seal ring.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION

Figure 1:
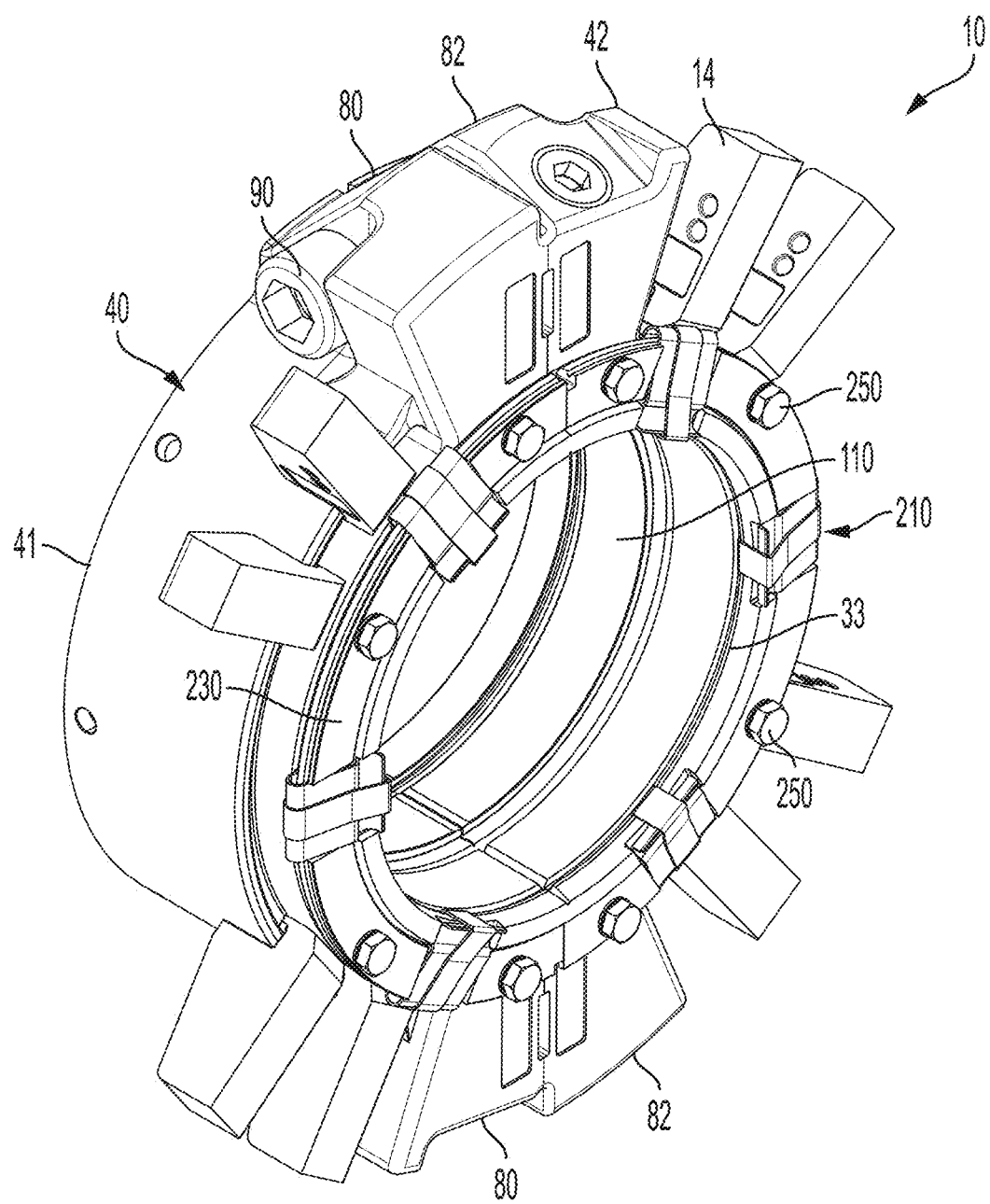
FIG. 1 is a perspective view of the spilt mechanical seal of the present invention.

The present invention provides a mechanical seal for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "mechanical seal system," "mechanical seal," "sealing system" and "sealing assembly" as used herein are intended to include various types of mechanical fluid sealing systems, including single or solid seals, split seals, concentric seals, spiral seals, cartridge seals, and other known mechanical seal and sealing types and configurations.

The term "shaft" is intended to refer to any suitable device in a mechanical system to which a mechanical seal can be mounted and includes shafts, rods and other known devices. The shafts can move in any selected direction, such as for example in a rotary direction or in a reciprocating direction.

The terms "axial" and "axially" as used herein refer to a direction generally parallel to the axis of a shaft. The terms "radial" and "radially" as used herein refer to a direction generally perpendicular to the axis of a shaft. The terms "fluid" and "fluids" refer to liquids, gases, and combinations thereof.

The terms "axially inner" or "axially inboard" as used herein refer to the portion of the stationary equipment and a mechanical seal proximate the stationary equipment employing the mechanical seal. Conversely, the terms "axially outer" or "axially outboard" as used herein refer to the portion of stationary equipment and a seal assembly distal from the mechanical system.

The term "radially inner" as used herein refers to the portion of the mechanical seal proximate a shaft. Conversely, the term "radially outer" as used herein refers to the portion of the mechanical seal distal from a shaft.

The terms "stationary equipment," "static surface" and "gland" as used herein are intended to include any suitable stationary structure housing a shaft or rod to which a seal is secured.

FIGS. 1-6C depict a mechanical seal 10 according to the teachings of the present invention. The illustrated mechanical seal 10 is preferably concentrically disposed about a shaft (not shown) and can be secured to an external wall of stationary equipment by fasteners, such as bolts, that seat between the illustrated bolt tabs 14. The mechanical seal 10 constructed in accordance with the teachings of the present invention provides a fluid-tight seal, thereby preventing a process medium, e.g., hydraulic fluid, from escaping the stationary equipment. The fluid-tight seal is achieved by a pair of sealing members, illustrated as a rotary seal ring 20 and a stationary seal ring 30, that form a seal therebetween. Each of the seal rings 20 and 30 has a pair of seal ring halves or segments and has a smooth arcuate sealing surface 21, 31, respectively. The smooth arcuate sealing surface 21, 31 of each seal ring is biased into sealing contact with the corresponding sealing surface 21 or 31 of the other seal ring. Preferably, the seal rings 20, 30 are split into a pair of segments, respectively, to facilitate installation, as described below. The sealing surfaces 21, 31 of the seal rings provide a fluid-tight seal operable under a wide range of operating conditions, including a vacuum condition. The rotary seal ring 20 is mounted within a holder assembly 110, which is in turn mounted within a gland assembly 40, and the stationary seal ring 30 is mounted within the gland assembly 40.

As shown in FIGS. 2A-3B and 5B, the illustrated holder assembly 110 defines a space 111 for receiving and retaining the rotary seal ring 20. The holder assembly 110 can be split to facilitate easy assembly and installation. In one embodiment, the holder assembly 110 comprises a pair of arcuate holder segments 112 that mate to form the annular holder assembly 110. The holder assembly 110, or each arcuate holder segment 112 if the holder assembly is split, has a radially outer surface 116 facing the gland assembly 40 and a first generally radially inner surface 124 (in addition to the radial innermost surface 138) for sealing against the seal ring 20 and defining the space 111 for receiving and retaining the rotary seal ring 20.

A sealing element, such as O-ring 188, is concentrically disposed about the rotary seal ring 20 to seal between the rotary seal ring 20 and the holder assembly 110. As shown, the O-ring 188 is preferably disposed about a radially outer surface 184 of an axially inner portion of the rotary seal ring 20 and seals against the radially inner surface 124 of the holder assembly 110. The radially inner surface 124 of the holder assembly 110 may include a detent groove 189 for receiving and seating the O-ring 188 disposed about the rotary seal ring 20 to facilitate assembly and operation of the mechanical seal and to maintain the rotary seal ring 20 in an optimal position.

Other sealing members can be provided to seal the interfaces between different components of the mechanical seal 10. For example, a flat annular elastomeric gasket 60 can be employed to seal the interface between the gland assembly 40 and the stationary equipment. Further, a holder gasket 160 can be mounted in a corresponding groove 158 to seal the holder segments 112 together if the holder assembly 110 is split. A holder/shaft elastomeric member, illustrated as O-ring 142, sits in a holder groove 140 formed along the inner surface 138 and seals between the rotary seal ring holder assembly 110 and the shaft. A stationary seal ring/gland elastomeric member, illustrated as O-ring 202, seals at an interface between the stationary seal ring 30 and the gland assembly 40 and provides radially inward pressure on the stationary seal ring 30. A gland gasket 76 can seat within a gland gasket groove 70 (FIG. 3A) so as to form a seal between the gland halves when assembled together. One skilled in the art will recognize that the mechanical seal assembly 10 may have any suitable means for sealing between different components.

In addition, the illustrated split mechanical seal 10 can include an anti-rotation mechanism (not shown) such as a pin or a flat surfaced element that extends axially between the rotary seal ring 20 and the holder assembly 110 to prevent relative rotary movement between the rotary seal ring and the holder assembly 110. Those of ordinary skill will also recognize that suitable fasteners, such as bolts, can be employed to secure together the gland halves and the holder halves. Certain components of the mechanical seal 10 of the present invention are similar to the mechanical seal assemblies described in U.S. Pat. Nos. 5,571,268, 7,708,283 and 10,352,457, the contents of which are herein incorporated by reference.

The illustrated holder assembly 110 for mounting the rotary seal ring 20 is disposed in a chamber 24 formed by the gland assembly 40, and spaced radially inward therefrom. It should be understood, however, that the holder assembly 110 need not be disposed within the gland assembly 40. Rather, the holder assembly 110 can be axially spaced from the gland assembly 40. The holder assembly 110 also includes an inwardly stepped surface that forms a second, axially-extending face 133. The radially inner surface 124 and the axially extending face 133 have a radially inward-extending first wall 132 formed therebetween. As shown, the inner axially extending face 133 and the radially innermost axially extending face or holder inner face 138 define an axially innermost second wall 134 therebetween that serves as the bottom of a cavity or seal ring receiving space 111 (FIG. 2B) that seats the rotary seal ring 20.

According to one embodiment, the sealing element or O-ring 188 for sealing between the rotary seal ring 20 and the rotary seal ring holder 110 seats in a groove 189, such as a detent groove, formed on the radially inner surface 124 of the holder assembly 110. The detent groove 189 is sized, located and configured to receive a radially outermost portion of the O-ring 188 so as to position and seat the O-ring 188 relative to the holder assembly 110 during installation without compromising performance. The detent groove 189 preferably seats the O-ring 188 above the stepped wall 132. Alternatively, the detent groove 189 seats the O-ring in another location between the holder assembly 110 and the rotary seal ring 20. A significant advantage of the detent groove 189 and the placement of the groove on the radially inner surface 124 of the holder is that it reduces the amount of compression needed to seat the O-ring 188 in the groove.

Figure 3A:
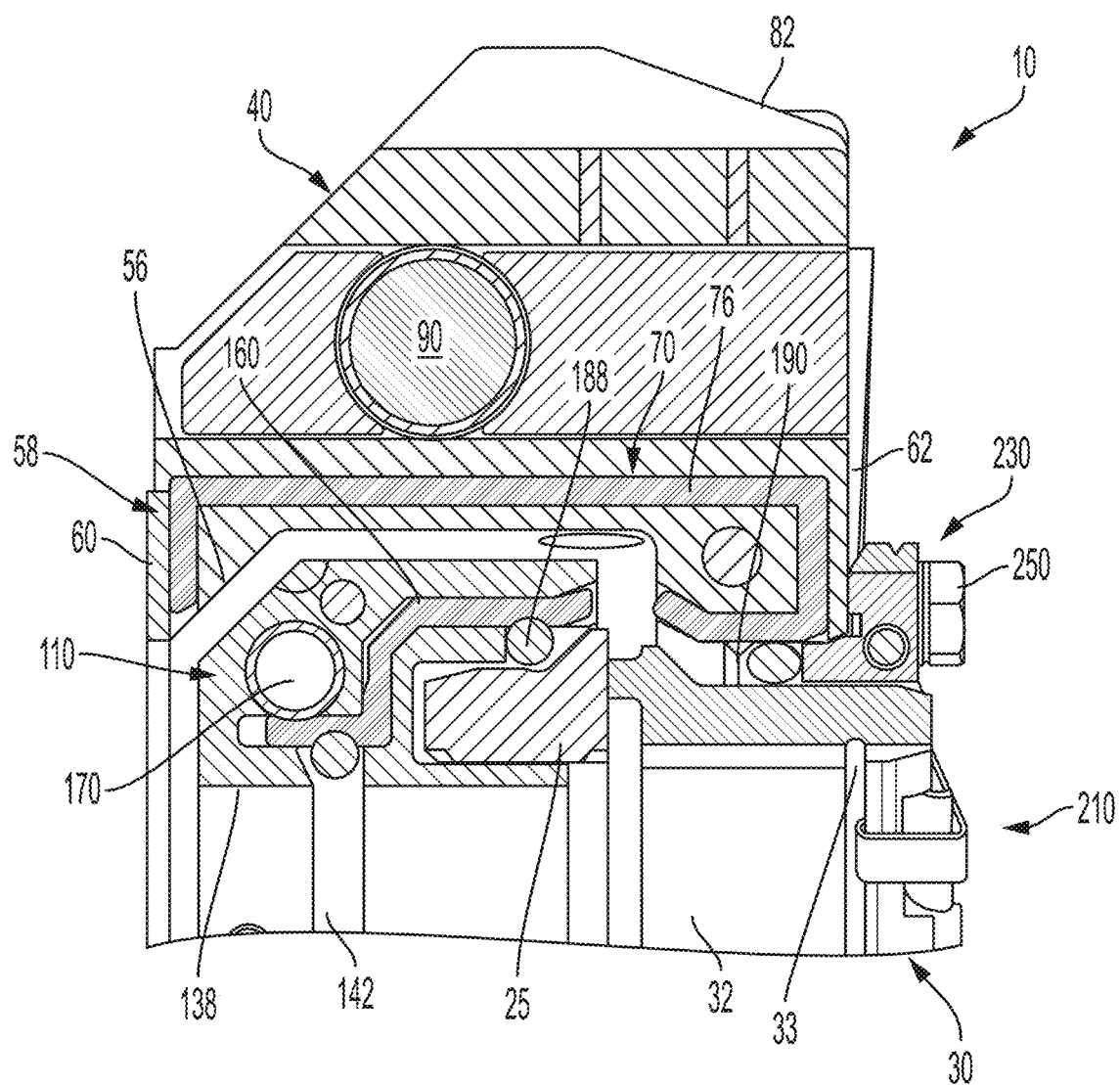
FIG. 3A is a partial cross-sectional view of the mechanical seal showing the sealing elements associated with the sealing rings in an engaged loaded position according to the teachings of the present invention.
Figure 3B:
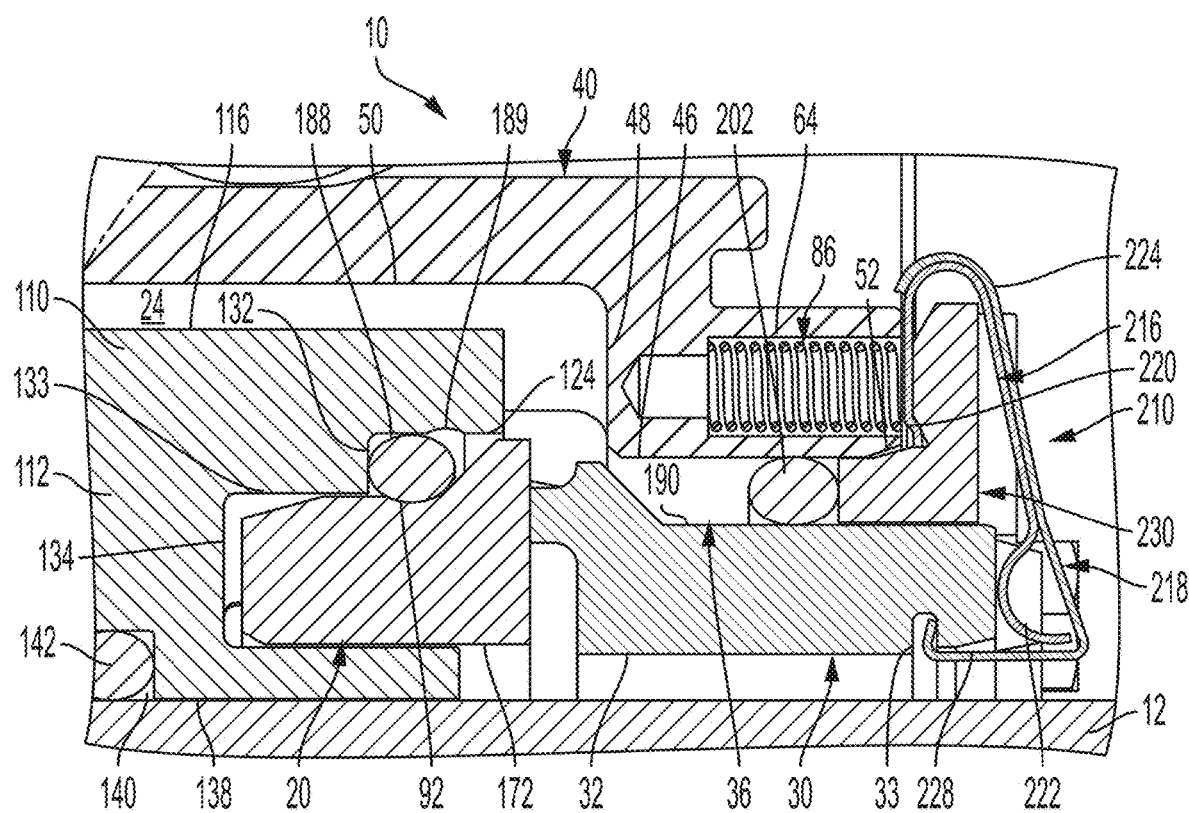
FIG. 3B is another partial cross-sectional view of the mechanical seal showing the sealing elements associated with the sealing rings in an engaged loaded position according to the teachings of the present invention.
Figure 4A:
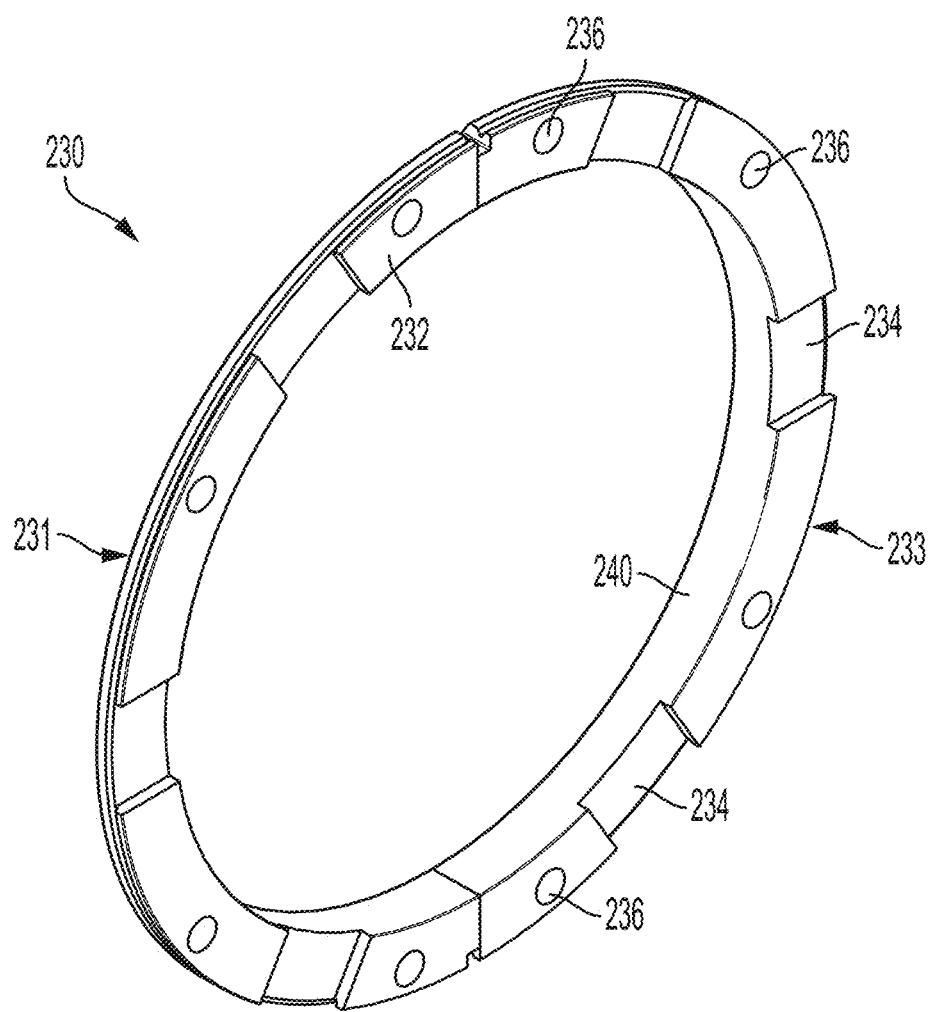
FIG. 4A is a perspective view of the spring holder plate employed by the mechanical seal of the present invention that can be employed to move the sealing elements associated with the sealing rings into the engaged and unengaged positions according to the teachings of the present invention.
Figure 4B:
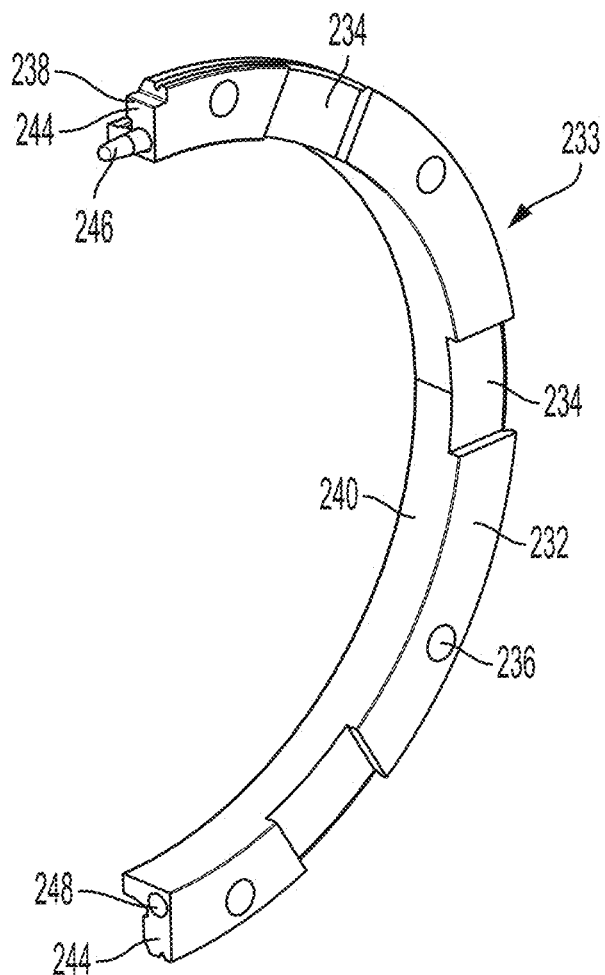
FIG. 4B is a perspective view of one of the spring holder segments of the spring holder plate according to the teachings of the present invention.
Figure 5A:
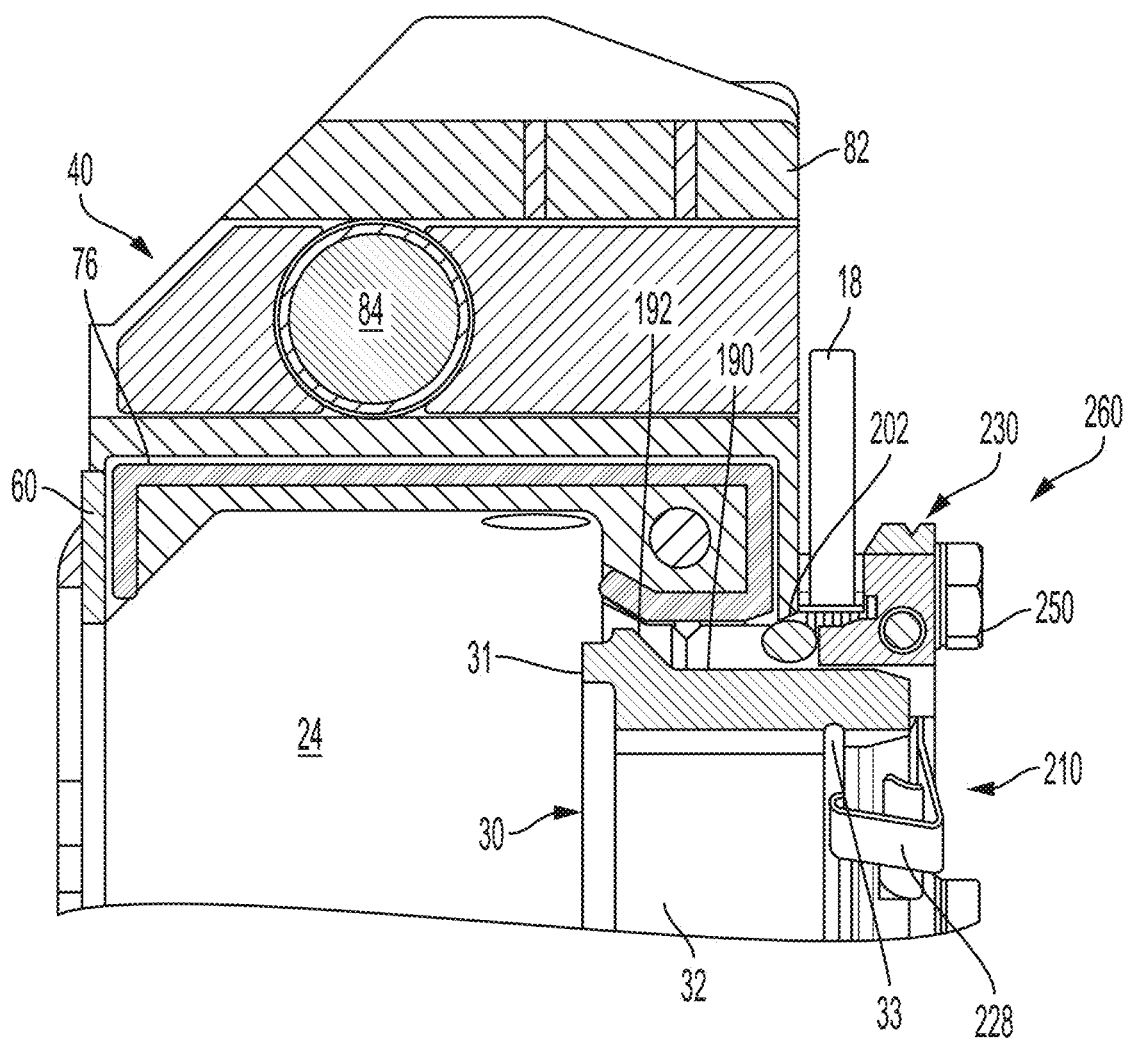
FIG. 5A is a partial cross-sectional view of the mechanical seal showing the preassembled gland subassembly unit according to the teachings of the present invention.
Figure 5B:
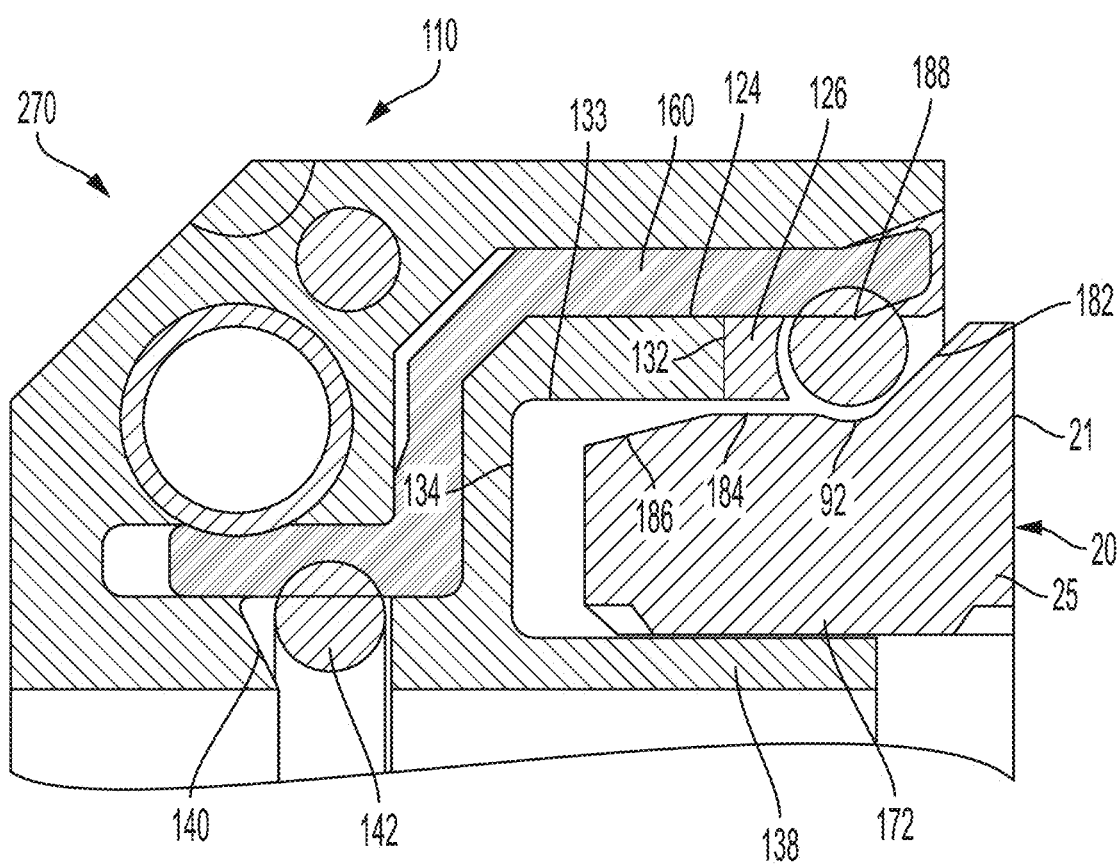
FIG. 5B is a partial cross-sectional view of the mechanical seal showing the preassembled holder subassembly unit according to the teachings of the present invention

The illustrated rotary sealing ring 20 includes a substantially smooth arcuate inner surface 172 and an outer surface comprising several surfaces including a first outer slanted surface 182 that forms a skirt portion, a relatively flat outer surface 184, and an axially inwardly tapered or sloped outer surface 186. The rotary seal ring 20 also includes a smooth arcuate sealing surface 21 disposed at a top of the seal ring 20. A rotary seal ring detent groove 92 is formed on the flat outer surface 184 adjacent the first slanted surface 182, as best shown in FIGS. 3B and 5B. The detent groove 92 formed in the rotary seal ring 20 performs at least two primary functions: first, the groove 92 helps to position the rotary seal ring 20 in the correct location with respect to the holder assembly 110, and second, the groove 92 allows the rotary seal ring to be pre-assembled in the holder assembly 110 by creating a double capture groove (between the holder detent groove 189 and the rotary seal ring detent groove 92) that captures the O-ring 188 therebetween while concomitantly retaining the rotary seal ring 20 within the holder assembly 110. The inner surface 172 of the rotary seal ring may have formed thereon a generally rectangular notch (not shown) that mounts over a holder protrusion (not shown) for coupling the components together. The inner diameter of the rotary seal ring inner surface 172 is greater than the diameter of the shaft to permit mounting thereon. The diameter of the rotary seal segment outer surface 184 is equal to or slightly less than the diameter of the axially extending face 133 of the holder segment, for mounting engagement with the holder assembly 110. The diameter of the outermost surface of the rotary seal ring 20 is less than the inner diameter of the inner surface 124 of the holder assembly 110. One skilled in the art will readily recognize based on the teachings herein that the rotary seal ring 20 may have any suitable configuration for interfacing with and sealing against another sealing element, such as the stationary seal ring 30.

As shown in FIGS. 1-3B and 5A, the illustrated mechanical seal 10 also includes the gland assembly 40. The illustrated gland assembly 40 includes a pair of arcuate gland segments 41, 42 that mate to form the annular seal gland assembly 40. The gland segments 41, 42 can be configured to engage with each other to facilitate assembly and operation of the mechanical seal 10. The gland assembly segments 41, 42 can employ an interlock mechanism to facilitate engagement of the gland segments. Each of the illustrated gland segments 41, 42 has an inner surface that has a first face 46 disposed at an axial outboard end that has an angled lead-in surface 52 and an integrally formed and stepped second face 50 that extends radially outwardly from the first face 46. The first face 46 and the second face 50 form, in combination, a first connecting annular wall 48. The stepped second face 50 transitions to a radially inwardly sloped surface 56. The gland segment inner surface formed by faces 46, 48, 50, and 56 define the space 24 for receiving the holder assembly 110, as described above. Further, each of the gland segments 41, 42 also has integrally formed therewith a pair of screw housings 80, 82. Each of the screw housings 80, 82 can include a transverse fastener-receiving aperture 84 formed substantially therethrough. The transverse aperture 84 mounts a screw 90 for securing together the gland segments 41, 42. The gland assembly 40 also includes a housing gasket groove 58 formed along a bottom inboard surface 59 of the gland assembly 40. The groove 58 seats the flat, annular elastomeric gasket 60. The gland assembly 40 also includes an axially outer topmost surface 62 that has a plurality of spring holes 64 and a plurality of fastener holes 66 formed therein. The spring holes 64 mount spring elements 80 and the fastener holes mount suitable fasteners, such as the bolts 250.

Figure 6A:
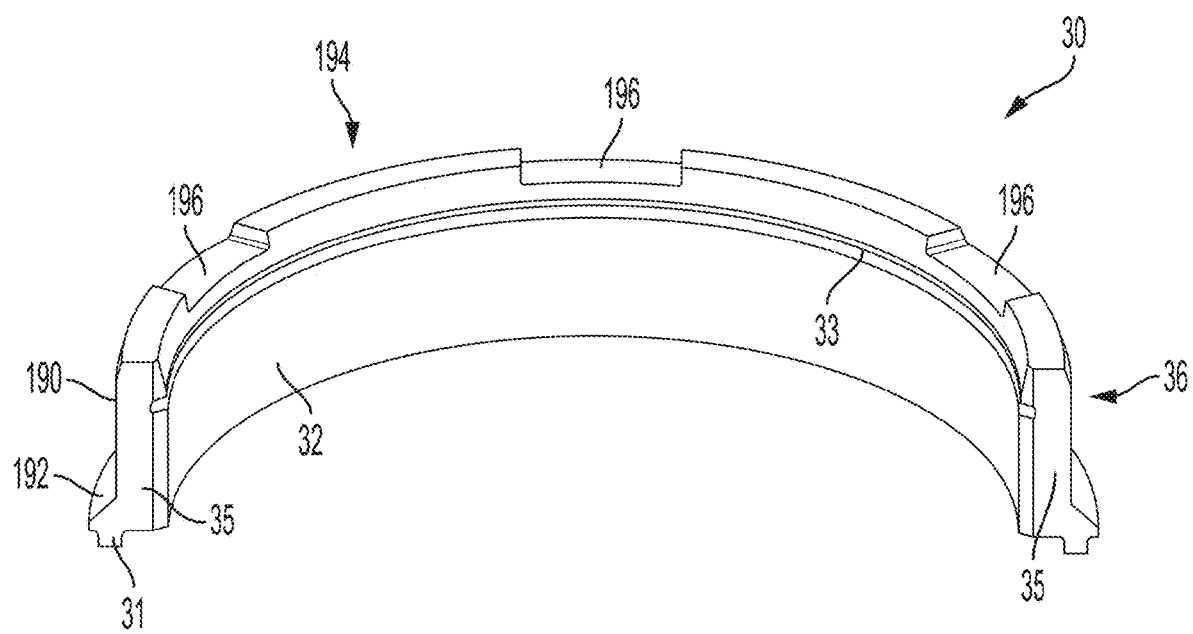
FIG. 6A is a perspective view of a stationary seal ring segment employed by the mechanical seal of the present invention.

As shown in FIGS. 2A-3B, 5A, and 6A-6C, and in particular as shown in FIG. 6A, the illustrated stationary seal ring 30 can similarly include a pair of arcuate seal ring segments, each identical or substantially identical to the other. The illustrated stationary seal ring segments can have a substantially smooth arcuate inner surface 32 extending parallel to the shaft axis and an opposed outer surface 36. The inner surface 32 has formed along the inner wall a circumferentially extending recess or groove 33 that is sized and configured for receiving a retaining portion of a biasing clip assembly 210, described in further detail below, for mounting and retaining the stationary seal ring 30 to a spring holding plate 230. The groove 33 can be continuous or non-continuous. If non-continuous, the groove can be formed as a series of recesses that are spaced apart along the inner surface 32. The outer surface 36 of the stationary seal ring 30 preferably has an axially extending first outer surface 190 that terminates in a radially outward extending sloped abutment surface 192. The stationary seal ring 30 preferably has an axially outer top surface 194 and an opposed smooth axially inner arcuate ring sealing surface 31 disposed at the bottom of the seal ring. The top surface 194 has a series of recesses or cut-outs 196 formed along the top surface that are sized and configured for selectively seating and/or engaging at least a portion of the biasing clip assembly 210. This arrangement helps align and seat the stationary seal ring 30 in the chamber 24, as well as functioning as a mechanical impedance for preventing the stationary seal ring 30 from rotating with the shaft 12 and the rotary seal ring 20.

The inner diameter of the stationary seal ring 30 as defined by the inner surface 32 is greater than the shaft diameter, and can if desired be greater than the diameter of the inner surface 172 of the rotary seal ring 20, thereby allowing relative motion therebetween. Therefore, the stationary seal ring 30 remains stationary while the shaft rotates. An elastomeric sealing member, e.g., O-ring 202, provides a radially inward biasing force sufficient to place the seal ring segment sealing faces 35 in sealing contact with the other stationary seal ring segment. Additionally, the O-ring 202 forms a fluid-tight and pressure-tight seal between the inner surface 46 of the gland assembly 40 and the stationary seal ring 30. The O-ring 202 seats in a first mounting region 204 defined by the gland first face 46 and the annular wall 48 and the outer surface 190 of the stationary seal ring 30 when disposed in the loaded position. In a preferred embodiment, the abutment 192 of the stationary seal ring 30 forms an angle relative to the stationary seal ring outer surface 190 preferably in the range of between about 30° and about 60°, and most preferably about 45°. The stationary seal ring 30 is preferably composed of a carbon or ceramic material, such as alumina or silicon carbide and the like.

The biasing assembly of the split mechanical seal 10 of the present invention, illustrated as a biasing clip assembly 210, also functions as an axial biasing means by providing resilient support for the stationary and rotary seal rings 20, 30 by axially biasing the seal rings such that the stationary and rotary sealing surfaces 21 and 31 are disposed in sealing contact with each other. As illustrated in FIGS. 2A-3B, the seal rings 20, 30 are floatingly and non-rigidly supported in spaced floating relation relative to the rigid walls and faces of the gland and holder assemblies 40, 110. This floating and non-rigid support and spaced relationship permits small radial and axial floating movements of the rotary seal segments and the stationary seal segments with respect to the shaft 12, while still allowing the rotary sealing surface 21 to follow and to be placed in sealing contact with the smooth arcuate sealing surface 31 of the stationary seal ring 30. Thus, the rotary and stationary seal ring sealing surfaces 21 and 31 are self-aligning as a result of this floating action.

The mechanical seal 10 of the present invention preferably employs a series of biasing clip assemblies 210 that are mounted on the axially outermost end of the gland assembly 40. Since the biasing clip assemblies 210 are identical, we need only describe herein one of the clip assemblies. The biasing clip assembly 210 preferably employs a pair of generally C-shaped spring clips defined as an inner spring clip 216 and an outer spring clip 218. The inner spring clip 216 has a first lower end that has a ridge portion 220 that seats within a recessed portion 242 of the spring holder plate 230. The engagement of the ridge portion 220 of the inner spring 216 with the recessed portion 242 helps secure the inner spring clip 216 thereto. The inner spring clip 216 further includes at an opposite end a bent portion 222 that seats on or can be disposed in contact with the recessed portion 196 formed in the top surface 194 of the stationary seal ring 30 to provide an axial biasing force thereto. The bent portion 222 thus functions as an axial biasing member for applying an axial biasing force to the seal rings 20, 30. The axial biasing force as is known to those of ordinary skill in the art is an inboard directed force that helps place the seal faces 21, 31 of the seal rings 20, 30, respectively, in sealing contact with each other.

The illustrated mechanical seal 10 also includes an axially movable spring holder plate 230, as shown for example in FIGS. 2A-4B. The illustrated spring holder plate 230 can be formed from a pair of plate segments 231, 233 that can be connected together. The spring holder plate 230 has an annular main body having a top surface 232 having a plurality of cut-outs or recesses 234 formed therein that are circumferentially spaced apart along the circumference of the main body. The top surface 232 also has formed therein a series of fastener-receiving apertures 236 for receiving fasteners, such as for example the bolts 250. The spring holder plate 230 also includes a bottom surface 238 having a recessed portion 242 formed adjacent an axially extending flange portion 240. The recesses 234 and the recessed portion 242 are configured for seating a portion of the biasing clip assembly 210, such as selected portions of the inner spring clip 216. The spring holder plate segments have end faces 244 that are configured for mating with the end faces of the other spring holder plate segment. One of the end faces 244 has a male type projection or protrusion 246 and the other end face has a female type hole or surface feature 248. The protrusion 246 is configured to seat within a corresponding hole 248 formed in the opposed end face 244 of the other spring holder plate segment. Similarly, the hole 248 is configured to receive a corresponding protrusion formed on the opposed end face of the other holder plate segment. The protrusions 246 and holes 248 enable the holder plate segments to be mechanically coupled together. The spring holder plate 230 is sized and dimensioned such that the flange portion 240 seats between the inner surface 46 of the gland assembly 40 and the outer surface 190 of the stationary seal ring 30. The spring holder plate 230 when tightened by the bolts 250 compresses the springs 86 and engages with the O-ring 202. The O-ring 202 is pushed by the flange portion 240 past the lead-in surface 52 of the gland assembly 40 and into the mounting region 204. Simultaneously, the stationary seal ring 20 is axially pressed towards the rotary seal ring 20 by the biasing clip assembly 210.

Figure 6B:
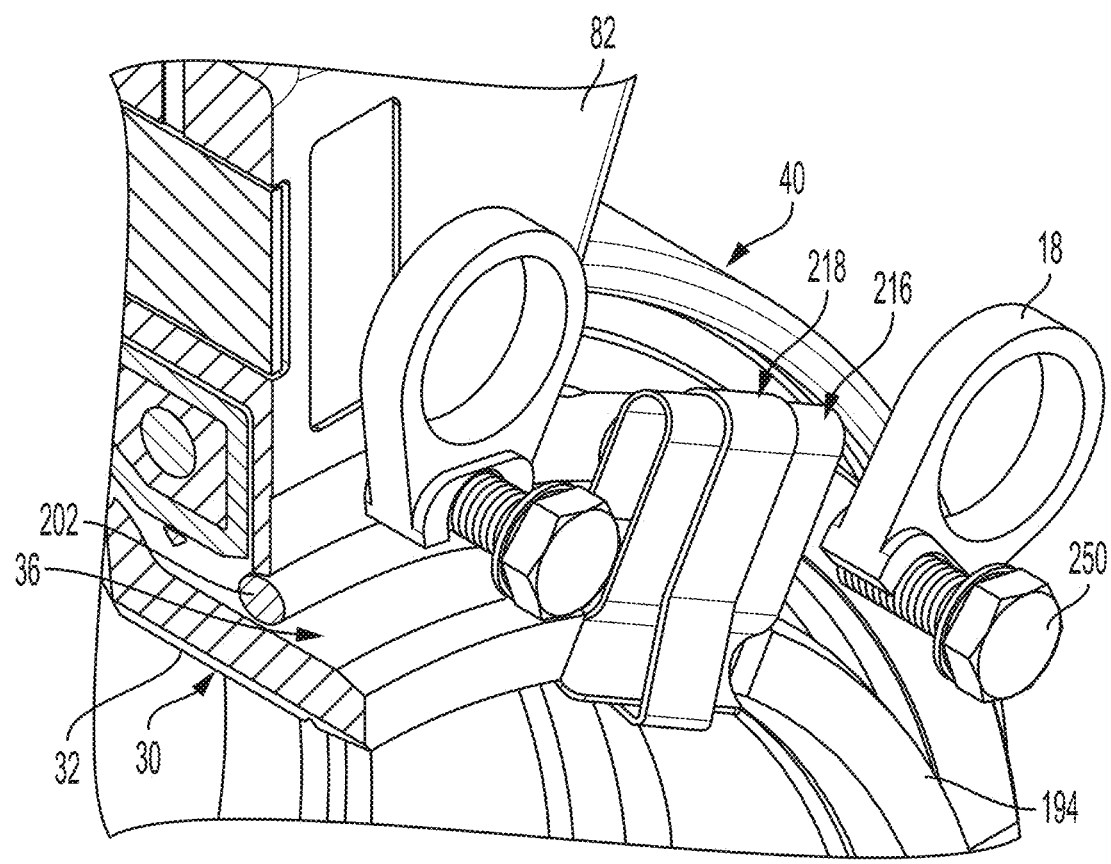
FIG. 6B is an exploded partial cross-sectional view with the spring holder plate removed showing the bolts, biasing clip assembly, and spacer elements employed by the mechanical seal of the present invention.
Figure 6C:
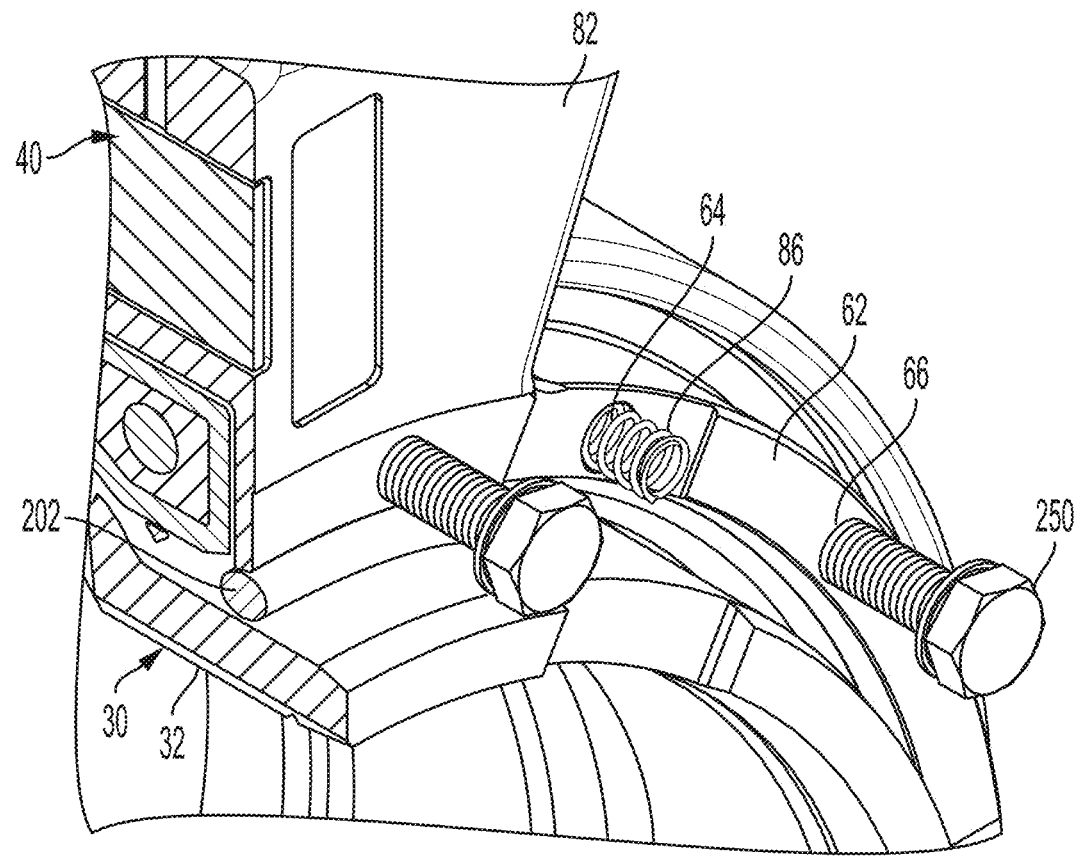
FIG. 6C is an exploded partial cross-sectional view with the spring holder plate, biasing clip assemblies and spacing elements removed showing the bolts and springs employed by the mechanical seal of the present invention.

The biasing clip assembly 210 of the mechanical seal 10 of the present invention includes an outer spring clip 218 that is adapted to be mounted over the inner spring clip 216. The outer spring clip 218 has a main body that includes a generally rounded first end portion 224 that is configured to be mounted on and engage the outer surface of the inner spring clip 216, as best illustrated in FIGS. 2B, 3B and 6B. The outer spring clip 218 also includes an opposite end that has a bent tab portion 228 extending outwardly therefrom. The bent tab portion 228 is configured to overlay the bent portion 222 of the inner spring clip 216 and to connect to and engage the recess 33 formed along the inner surface 32 of the stationary seal ring 30. The bent tab portion 228 of the outer spring clip 218 retains or mounts the stationary seal ring 30 to the gland assembly 40 by engaging with the recess 33. By retaining or mounting the stationary seal ring 30 to the gland assembly 40, the components of the mechanical seal 10 can be pre-assembled, which helps facilitate easy installation of the split mechanical seal 10. Those of ordinary skill in the art will readily recognize that the inner and outer spring clips 216, 218 can have any suitable shape or configuration provided that the clips can engage with the spring plate holder 230 and the stationary seal ring 30 so as to apply an axial biasing force to the stationary seal ring and to the spring plate holder.

In assembly and during operation, the mechanical seal 10 can be composed of four selected halves or segments that have selected seal components that are preassembled together to form subassembly units. For example, as shown in FIG. 5A, each gland segment of the gland assembly 40 can be preassembled with selected components to form a gland subassembly unit 260 that includes a corresponding half or segment of the stationary seal ring 30, the spring holder plate 230, the O-ring 202, and a selected number of biasing clip assemblies 210 that correspond to the number of recesses 234 formed in the top surface 232 of the spring holder plate 230. The inner spring clip 216 is mounted on and about the spring holder plate 230 and then the outer spring clip 218 is mounted over or on top of the inner spring clip 216. The bent tab portion 228 of the outer spring clip 218 engages with the recess 33 formed along the inner surface 32 of the stationary seal ring 30 and the opposite end of the spring clips engage with the spring holder plate 230. The springs 86 are mounted in the spring holes 64 formed in the top surface 62 of the gland assembly 40 and the spring holder plate 230 is secured to the top surface by the bolts 250 when disposed in the corresponding fastener holes 66.

Similarly, as shown for example in FIG. 5B, each holder segment of the holder assembly 110 can be preassembled with selected seal components to form a holder subassembly unit 270 that includes a corresponding half or segment of the rotary seal ring 20 and the O-ring 188. A holder spacer element 126 is disposed in the holder space 111. The spacer element 126 assists with initially axially positioning selected seal components, such as for example the O-ring 188 and for example the rotary seal ring 20, in a selected axial position so as to prevent accidental damage to the components. The holder spacer element is removed prior to the holder assembly being mounted about the shaft 12. The O-ring 188 is disposed in the detent groove 92 formed in the outer surface 184 of the rotary seal ring 20. When the O-ring 188 and the rotary seal ring segment are disposed within the gland assembly 40, the O-ring 188 is positioned to seat within the detent groove 189 formed in the inner surface 124 of the holder assembly 120. The detent grooves 92, 189 serve to capture and hold the O-ring 188 without overly loading the O-ring in an axial or radial direction. The gland and holder subassembly units 260, 270 can include other sealing elements as well, including for example, the holder gasket 160, the gland gaskets 60 and 76, and other O-rings and sealing elements, such as the O-ring 142. The sealing elements are also split so as to fit in the subassembly units.

When assembling together the holder and gland subassembly units, the sealing elements, such as for example the O-rings 188, 202, can become pinched when the O-rings are moved from the unloaded position to the loaded position. For example, as the O-rings are compressed radially, they expand circumferentially with the ends of the O-ring segments protruding, potentially buckling when joined, thereby causing pinching by metal or seal face parts at the location of the split. In order to prevent this from occurring, the present invention provides for a selected assemblage of components that forms a loading assembly that does not prematurely load the O-rings 188, 202 prior to assembly of the subassembly units about the shaft 12, thus preventing the O-rings 188, 202 from extruding past the end faces of the holder and gland segments.

With regard to the holder subassembly units 270, each of the O-ring segments 188 are concentrically disposed about the rotary seal ring segments 20 and are preferably disposed in contact with the rotary seal ring outer surfaces 182, 184 and the rotary seal ring detent groove 92 to form the rotary seal ring pre-assembly. The O-ring 188 and the rotary seal ring 20 are mounted in the holder assembly 110 such that the O-ring 188 seats within the detent grooves 189, 92 formed in the surfaces 124, 184. This prevents, reduces or minimizes premature and unwanted loading of the O-ring 188 when the holder subassembly units 270 are assembled together. As such, the end regions of the O-ring segments do not extrude past the end faces of the holder and gland segments. The holder pre-assembly units 270, 270 are then disposed about the shaft 12. A coupling mechanism, such as a drive flat, can be employed to rotationally couple the rotary seal ring 20 to the holder assembly 110 for relative rotation therewith. The coupling mechanism can be disposed on either the holder assembly or the rotary seal ring, and in a preferred embodiment, is disposed on both the rotary and stationary seal rings. The detent groove 189 of the holder assembly 110 and the detent groove 92 of the rotary seal ring 20 receive and retain the O-ring 188 in an optimal position. The O-ring 188 provides an inward radial force sufficient to place the axial seal faces 25 of the rotary seal ring segments in sealing contact with each other. The holder segments are then secured together by tightening the screws 170 that are positively maintained in the fastener-receiving apertures 164. The rotary seal ring segments are spaced from the inner surface 124 of the holder assembly and are non-rigidly supported therein by the O-ring 188, thereby permitting small radial and axial floating movements of the rotary seal ring 20. When disposed within the detent grooves, the O-ring 188 is disposed in the unloaded position.

With regard to the gland pre-assembly unit 260, the O-ring 202 is disposed about the stationary seal ring 30 and then disposed adjacent the lead-in surface 52 formed along the inner surface of the gland assembly 40. The springs 86 are mounted within the corresponding spring holes 64 formed in the top surface 62 of the gland assembly 40. The spring holder plate 230 is secured to the gland assembly top surface 62 by partially tightening the bolts 250 in the fastener holes 66. The spring holder plate 230, the springs 86 and the bolts 250 can form the loading assembly. The multiple biasing inner clips 216 are mounted along the perimeter or circumferential edge of the top surface 61 of the gland assembly. The ridge portion 220 of the first end of the inner spring clip 216 is mounted in the recessed portion 242 formed in the bottom surface 238 of the spring holder plate 230. The outer spring clip 218 when mounted on the inner spring clip 216 has the bent tab portion 228 that has an edge or tip that seats in the groove 33 formed in the inner surface 32 of the stationary seal ring 30. The O-ring 202 is captured between the lead-in surface 52 (FIG. 3B) and the outer surface 190 of the stationary seal ring 30.

Figure 2A:
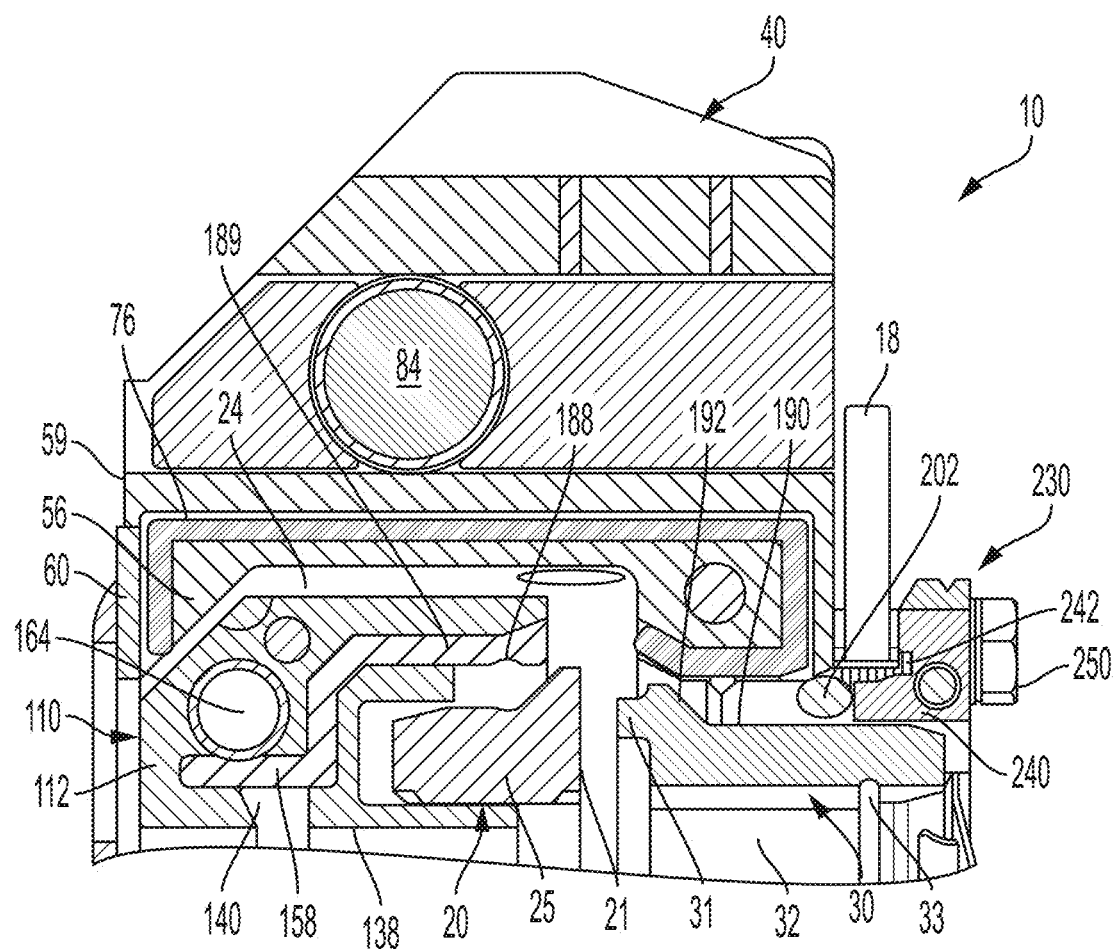
FIG. 2A is a partial cross-sectional view of the mechanical seal showing the sealing rings and sealing elements in a disengaged unloaded position according to the teachings of the present invention.
Figure 2B:
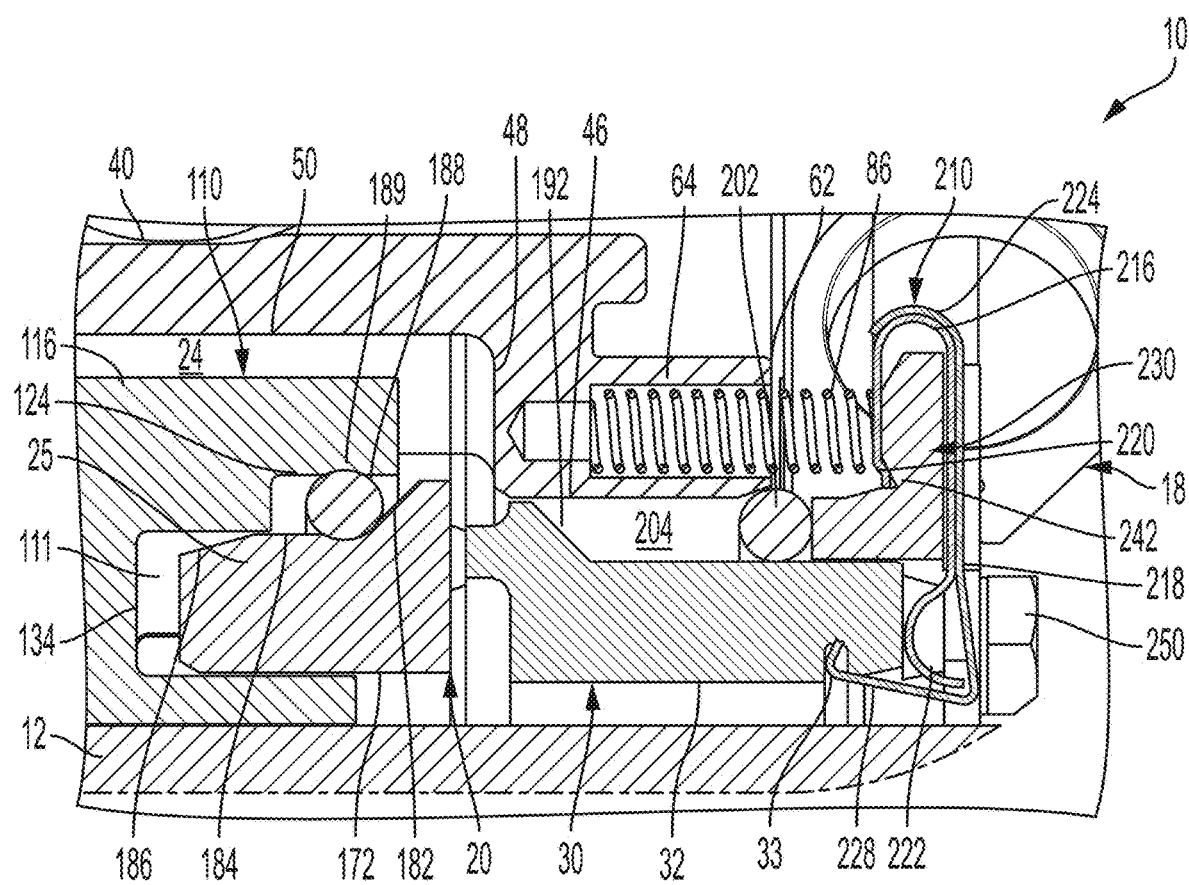
FIG. 2B is a partial cross-sectional view of the mechanical seal showing the sealing elements associated with the sealing rings in a disengaged unloaded position according to the teachings of the present invention.

As shown in FIGS. 2A and 2B, the gland subassembly unit 260 disposes the O-ring 202 into a disengaged and unloaded position and the holder subassembly unit 270 disposes the O-ring 188 in the detent grooves 188, 92, thus also placing the O-ring 188 in the disengaged unloaded position. As such, the O-rings 188, 202 do not extrude past the seal faces of the holder and gland segments. Once fully assembled, the operator can move the O-rings 188 and 202 into an engaged and loaded position by axially moving the spring holder plate 230 in an inboard direction, as shown in FIGS. 3A and 3B. For example, the operator can selectively tighten the bolts 250 with a suitable tool, such as a wrench. When tightened, the bolts 250 serve to move the spring holder plate 230 in the axial inboard direction against the bias of the springs 86. The bottom surface of the flange portion 240 contacts the O-ring 202 and pushes the O-ring 202 in the axial inboard direction past the angled lead-in surface 52 and into the space 204. The O-ring 202 is hence squeezed (e.g., loaded) into the region 204 by radial compression and the O-ring is disposed in sealing contact with the outer surface 190 of the stationary seal ring 30 and the inner face or surface 46 of the gland assembly 40. The O-ring 202 is thus placed in the engaged and loaded position. Further, since the stationary seal ring 30 is coupled to the spring holder plate 230 by the biasing clip assembly 210, the movement of the spring holder plate 230 in the axial direction serves to push or move the stationary seal ring 30 in the axial inboard direction. The stationary seal ring 30 contacts the rotary seal ring 20 via the seal faces 21, 31, and hence pushes the rotary seal ring 20 in the axial inboard direction. The axial movement of the rotary seal ring 20 pushes the O-ring 188 out of the detent groove 189 formed in the inner surface 124 of the holder assembly 110. When moved out of the detent groove 189, the O-ring is squeezed (e.g., loaded) between the inner surface 124 of the holder assembly 110 and the detent groove 92 of the outer surface 184 of the rotary seal ring 20. The O-ring 188 thus seats within the detent groove 92 when in the loaded and unloaded positions. The detent grooves 189 and 92 preferably have a curved cross-section and are discrete grooves that are sized and configured for seating the O-ring 188.

The illustrated loading assembly can thus be employed to axially move the O-rings 202, 188 into the engaged and loaded position where they are radially compressed. The O-rings are compressed after the gland and holder subassembly units have been assembled and secured around the shaft 12 and to the stationary equipment. The loading assembly of the present invention avoids having the O-rings extrude past the end faces prior to assembly where they can be pinched when the subassembly units are secured together. Since the gland and holder surfaces defining the regions mounting the O-rings 202, 188 are in contact with each other prior to the O-ring being radially compressed in the sealing location, there is no protruding end of the O-ring segments with the potential resulting misalignment of the sealing elements.

The spring holder plate 230 further includes segments 231, 233 that are secured together using male and female types mechanical connections. The spring holder plate 230, prior to being tightened by the operator, serves to hold the rotary and stationary O-rings 188, 202 in a free state or unloaded position during the securing of the gland and holder subassembly units 260, 270 around the shaft 12. The preassembled subassembly units 260, 270 allow for sequenced installation of the units. Specifically, the holder subassembly units 270 (e.g., rotary subassembly units) are secured to the shaft 12 and then the gland subassembly units 260 (e.g., stationary subassembly units) are secured around the rotary components and to the stationary equipment. The axial movement of the spring holder plate 230 via the bolts 250 pushes the seal faces 21, 31 and the rotary and stationary O-rings 188, 202 into their operating locations. As such, a single element can be used to displace the O-rings 188, 202 from a radially uncompressed state (e.g., unloaded position) to a compressed energized state (e.g., loaded position).

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A mechanical seal for mounting to a housing having a shaft, comprising
 a gland assembly configured for mounting to the housing and having a top surface and an inner surface forming a gland mounting region, wherein the top surface of the gland assembly has a plurality of gland fastener holes formed therein, wherein the inner surface of the gland assembly has a lead-in angled surface,
 a holder assembly forming a holder chamber and disposed within the gland mounting region and having a cylindrical inner surface,
 a rotary seal ring disposed within the holder chamber of the holder assembly and having a cylindrical outer surface,
 a rotor sealing element disposed about the outer surface of the rotary seal ring,
 a stationary seal ring disposed within the gland mounting region and having an outer surface,
 a stator sealing element disposed about the outer surface of the stationary seal ring,
 an axially movable spring holder plate having a top surface and an opposed bottom surface and a radially inwardly spaced flange portion, wherein the top surface has a plurality of fastener apertures formed therein,
 a plurality of biasing clip assemblies configured for mounting about the spring holder plate and for coupling with the stationary seal ring for coupling the spring holder plate to the stationary seal ring, and
a plurality of fasteners for mounting in the fastener apertures and the gland fastener holes and for securing the spring holder plate to the top surface of the gland assembly,
wherein the inner surface of the holder assembly or the outer surface of the rotary seal ring has a detent groove formed therein,
wherein the stator sealing element and the rotor sealing element are disposable in a radially uncompressed state when in a first unloaded position and wherein the spring holder plate is movable in the axial direction when the plurality of fasteners are tightened so as to move the stator sealing element and the rotor sealing element in the axial direction into a radially compressed state when in a second loaded position,
wherein in the first unloaded position the stator sealing element is disposed between the lead-in angled surface and the outer surface of the stationary seal ring and the rotor sealing element is disposed between the inner surface of the holder assembly and the outer surface of the rotary sealing element in the detent groove such that the stator sealing element and the rotor sealing element are disposed in the radially uncompressed state, and
wherein in the second loaded position the stator sealing element is moved axially inwardly from the lead-in angled surface by the flange portion of the spring holder plate and is disposed between the inner surface of the gland and the outer surface of the stationary seal ring and the rotor sealing element is displaced from the detent groove by the axial inward movement of the rotary seal ring such that the stator sealing element and the rotor sealing element are disposed in the radially compressed state.

2. The mechanical seal of claim 1, wherein the top surface of the gland assembly has a plurality of spring holes formed therein, further comprising a plurality of springs for mounting in the plurality of spring holes.

3. The mechanical seal of claim 2, wherein the inner surface of the holder assembly has the detent groove formed therein forming a holder detent groove.

4. The mechanical seal of claim 3, wherein the outer surface of the rotary seal ring has the detent groove formed therein forming a rotary detent groove.

5. The mechanical seal of claim 4, wherein an inner surface of the stationary seal ring has a groove formed therein for coupling to a portion of each of the plurality of biasing clip assemblies, wherein, when the plurality of fasteners are tightened, the plurality of biasing clip assemblies applies an axially inward force to the stationary seal ring which in turn applies an axial inward force to the rotary seal ring and the plurality of fasteners axially moves the spring holder plate between the first loaded position and the second loaded position,
wherein the first unloaded position and the rotor sealing element is disposed in the holder detent groove and the rotary detent groove, and
wherein the second loaded position the rotor sealing element is displaced from the holder detent groove by the axial inward movement of the rotary seal ring.

6. The mechanical seal of claim 4, wherein the spring holder plate has a plurality of recesses formed in the top surface.

7. The mechanical seal of claim 6, wherein a portion of each of the plurality of biasing clip assemblies seats in a portion of the recesses.

8. The mechanical seal of claim 6, wherein the stationary seal ring has a plurality of spaced apart recesses formed in a top surface thereof.

9. The mechanical seal of claim 8, wherein each of the plurality of biasing clip assemblies comprises
an inner spring clip having a main body having
an inner ridge portion formed at a first end thereof and configured for engaging with a recessed portion formed in the bottom surface of the spring holder plate, and
a bent portion formed at a second opposed end and configured for engaging with one of the plurality of recesses formed in the top surface of the stationary seal ring, and
an outer spring clip having a first end that is sized and configured for mounting on the main body of the inner spring clip and an opposed second end having a bent tab portion sized and configured for engaging with the groove formed in the inner surface of the stationary seal ring.

10. The mechanical seal of claim 1, wherein the spring holder plate has a main body composed of first and second spring holder plate segments and each of the spring holder plate segments has first and second end faces each of which has a surface feature formed thereon,
wherein the surface feature of the first end face of the first spring holder plate segment is a protrusion and the surface feature of the second end face of the first spring holder plate segment is an aperture, and
wherein the surface feature of the first end face of the second spring holder plate segment is an aperture configured for seating the protrusion on the first end face of the first spring plate holder segment, and wherein the surface feature of the second end face of the second spring holder plate segment is a protrusion configured for seating in the aperture formed in the second face of the first spring holder plate segment.

11. The mechanical seal of claim 10, wherein the main body has a plurality of recesses formed in the top surface thereof.

12. A method for positioning a plurality of sealing elements in a mechanical seal, wherein the mechanical seal includes
a gland assembly configured for mounting to the housing and having a top surface and an inner surface forming a gland mounting region, wherein the top surface of the gland assembly has a plurality of gland fastener holes formed therein,
a holder assembly having an inner surface forming a holder chamber and disposed within the gland mounting region,
a rotary seal ring disposed within the holder chamber of the holder assembly and having an inner surface and an opposed outer surface,
a rotor sealing element disposed about the outer surface of the rotary seal ring,
a stationary seal ring disposed within the gland mounting region and having an inner surface and an opposed outer surface,
a stator sealing element disposed about the outer surface of the stationary seal ring,
an axially movable spring holder plate having a top surface and an opposed bottom surface and a radially inwardly spaced flange portion, wherein the top surface has a plurality of fastener apertures formed therein,
a plurality of biasing clip assemblies configured for mounting about the spring holder plate and for coupling with the stationary seal ring for coupling the spring holder plate to the stationary seal ring, and a plurality of fasteners for mounting in the fastener apertures and the gland fastener holes and for securing the spring holder plate to the top surface of the gland assembly, the method comprising, when the plurality of fasteners are tightened, configuring the plurality of biasing clip assemblies to apply an axially inward force to the stationary seal ring which in turn applies an axial inward force to the rotary seal ring, and configuring the spring holder plate to move axially between:

an unloaded position where the stator sealing element is disposed between a lead-in angled surface formed in the inner surface of the gland assembly and the outer surface of the stationary seal ring and the rotor sealing element is disposed in a holder detent groove formed in the inner surface of the holder assembly and in a rotary detent groove formed in the outer surface of the rotary seal ring, wherein the stator sealing element and the rotor sealing element are in a radially uncompressed state when in the unloaded position, and a loaded position where the stator sealing element is configured to move axially inwardly from the lead-in angled surface by the flange portion of the spring holder plate and is disposed between the inner surface of the gland and the outer surface of the stationary seal ring and the rotor sealing element is configured to be displaced from the holder detent groove by the axial inward movement of the rotary seal ring, wherein the stator sealing element and the rotor sealing element are in a radially compressed state when in the loaded position.

13. The method of claim 12, wherein each of the plurality of biasing clip assemblies comprises an inner spring clip having a main body having an inner ridge portion formed at a first end thereof and configured for engaging with a recessed portion formed in the bottom surface of the spring holder plate, and a bent portion formed at a second opposed end and configured for engaging with one of the plurality of recesses formed in the top surface of the stationary seal ring, and an outer spring clip having a first end that is sized and configured for mounting on the main body of the inner spring clip and an opposed second end having a bent tab portion sized and configured for engaging with the groove formed in the inner surface of the stationary seal ring, wherein the step of configuring the plurality of biasing clip assemblies to apply an axially inward force, when the plurality of fasteners are tightened, comprises applying an axial inward force to the stationary seal ring with the inner spring clip by contacting the recess formed in the top surface of the stationary seal ring.

\* \* \* \* \*